US011558803B2

(12) United States Patent
Hosseini et al.

(10) Patent No.: US 11,558,803 B2
(45) Date of Patent: Jan. 17, 2023

(54) PATH SELECTION FOR SIDELINK RELAY

(71) Applicant: QUALCOMM Incorporated, San Diego, CA (US)

(72) Inventors: Seyedkianoush Hosseini, San Diego, CA (US); Gabi Sarkis, San Diego, CA (US); Peter Gaal, San Diego, CA (US); Wanshi Chen, San Diego, CA (US); Hwan Joon Kwon, San Diego, CA (US); Krishna Kiran Mukkavilli, San Diego, CA (US); Tingfang Ji, San Diego, CA (US); Karthika Paladugu, San Diego, CA (US); Yi Huang, San Diego, CA (US); Yeliz Tokgoz, San Diego, CA (US); Gokul Sridharan, Sunnyvale, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/199,192

(22) Filed: Mar. 11, 2021

(65) Prior Publication Data

US 2021/0289419 A1 Sep. 16, 2021

Related U.S. Application Data

(60) Provisional application No. 62/990,278, filed on Mar. 16, 2020.

(51) Int. Cl.
*H04W 72/04* (2009.01)
*H04W 40/04* (2009.01)
(Continued)

(52) U.S. Cl.
CPC .......... *H04W 40/04* (2013.01); *H04B 7/0626* (2013.01); *H04L 1/0007* (2013.01); *H04L 1/1819* (2013.01); *H04W 92/18* (2013.01)

(58) Field of Classification Search
CPC .... H04W 40/04; H04W 92/18; H04B 7/0626; H04L 1/0007; H04L 1/1819;
(Continued)

(56) References Cited

U.S. PATENT DOCUMENTS 10,849,037 B2 * 11/2020 Feng ...................... H04W 76/23
2014/0023008 A1 * 1/2014 Ahn ......................... H04L 5/006
370/329

(Continued)

FOREIGN PATENT DOCUMENTS

EP 3605896 A1 2/2020

OTHER PUBLICATIONS

Huawei, et al., "Sidelink CSI", 3GPP Draft, R1-1813553, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 3, 2018 (Nov. 3, 2018), XP051479891, 6 pages, Retrieved from the Internet: URL: http://www.3gpp.org/ftp/tsg%5Fran/WG1%5FRL1/TSGR1%5F95/Docs/R1%2D1813553%2Ezip, [retrieved on Nov. 3, 2018] Sections 1-5, the Whole Document.

(Continued)

*Primary Examiner* — Mahbubul Bar Chowdhury
(74) *Attorney, Agent, or Firm* — Harrity & Harrity, LLP \ Qualcomm

(57) ABSTRACT

Various aspects of the present disclosure generally relate to wireless communication. In some aspects, a user equipment may select, from a first path and a second path, a path for an uplink communication associated with at least one of a
(Continued)

variable payload size for hybrid automatic repeat request (HARQ) feedback or channel state information (CSI) feedback, wherein the first path is on an uplink of the UE and the second path is on a sidelink of the UE; and transmit the uplink communication on the selected path. Numerous other aspects are provided.

30 Claims, 8 Drawing Sheets

(51) Int. Cl.
  *H04L 1/18* (2006.01)
  *H04L 1/00* (2006.01)
  *H04B 7/06* (2006.01)
  *H04W 92/18* (2009.01)

(58) Field of Classification Search
  CPC ..... H04L 1/1864; H04L 1/1671; H04L 5/001; H04L 5/0032; H04L 5/0064; H04L 5/0087; H04L 5/0091; H04L 5/0053; H04L 5/0023; H04L 2001/0097
  See application file for complete search history.

(56) References Cited

U.S. PATENT DOCUMENTS

| | | | |
|---|---|---|---|
| 2018/0206176 A1* | 7/2018 | Panteleev | H04W 28/04 |
| 2019/0364492 A1* | 11/2019 | Azizi | H04W 68/005 |
| 2020/0127768 A1* | 4/2020 | Seo | H04B 7/0626 |
| 2020/0128470 A1* | 4/2020 | Mok | H04W 72/02 |
| 2020/0245311 A1* | 7/2020 | Uchiyama | H04W 72/14 |
| 2020/0296738 A1* | 9/2020 | Inokuchi | H04W 72/1268 |
| 2021/0105683 A1* | 4/2021 | You | H04W 36/06 |
| 2021/0274545 A1* | 9/2021 | Adjakple | H04W 28/0268 |
| 2021/0307029 A1* | 9/2021 | Uchiyama | H04W 72/0446 |
| 2021/0314930 A1* | 10/2021 | Uchiyama | H04W 72/042 |
| 2022/0078768 A1* | 3/2022 | El Hamss | H04L 1/1812 |

OTHER PUBLICATIONS

International Search Report and Written Opinion—PCT/US2021/022131—ISA/EPO—dated Jun. 29, 2021.
SAMSUNG: "Considerations on Sidelink HARQ Procedure", 3GPP Draft, 3GPP TSG RAN WG1 #96, R1-1902278, 3GPP TSG RAN WG1, Meeting #96, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 15, 2019 (Feb. 15, 2019), XP051599973, 11 Pages, Retrieved from the Internet: URL:http://www.3gpp.org/ftp/tsg%5Fran/WG1%5FRL1/TSGR1%5F96/Docs/R1%2D1902278%2Ezip [retrieved on Feb. 15, 2019], pp. 1-3, section "3 Sidelink HARQ in Mode 1", section "4 CBG-based transmission in Unicast", section "5 CBG-based transmission in Groupcast", section "6 Conclusions", Proposals 2-7.

* cited by examiner

PATH SELECTION FOR SIDELINK RELAY

CROSS-REFERENCE TO RELATED APPLICATION

This patent application claims priority to U.S. Provisional Patent Application No. 62/990,278, filed on Mar. 16, 2020, entitled "PATH SELECTION FOR SIDELINK RELAY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for path selection for a sidelink relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include selecting, from a first path and a second path, a path for an uplink communication associated with at least one of a variable payload size for hybrid automatic repeat request (HARQ) feedback or channel state information (CSI) feedback, wherein the first path is on an uplink of the UE and the second path is on a sidelink of the UE; and transmitting the uplink communication on the selected path.

In some aspects, a method of wireless communication, performed by a base station, may include selecting, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE; and receiving the uplink communication based at least in part on the selected path.

In some aspects, a UE for wireless communication may include a memory and one or more processors operatively coupled to the memory. The memory and the one or more processors may be configured to select, from a first path and a second path, a path for an uplink communication associated with at least one of a variable payload size for HARQ feedback or CSI feedback, wherein the first path is on an uplink of the UE and the second path is on a sidelink of the UE; and transmit the uplink communication on the selected path.

In some aspects, a base station for wireless communication may include a memory and one or more processors operatively coupled to the memory. The memory and the one or more processors may be configured to select, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE; and receive the uplink communication based at least in part on the selected path.

In some aspects, a non-transitory computer-readable medium may store one or more instructions for wireless communication. The one or more instructions, when executed by one or more processors of a UE, may cause the one or more processors to select, from a first path and a second path, a path for an uplink communication associated with at least one of a variable payload size for HARQ feedback or CSI feedback, wherein the first path is on an uplink of the UE and the second path is on a sidelink of the UE; and transmit the uplink communication on the selected path.

In some aspects, a non-transitory computer-readable medium may store one or more instructions for wireless communication. The one or more instructions, when executed by one or more processors of a base station, may cause the one or more processors to select, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE; and receive the uplink communication based at least in part on the selected path.

In some aspects, an apparatus for wireless communication may include means for selecting, from a first path and a second path, a path for an uplink communication associated with at least one of a variable payload size for HARQ feedback or CSI feedback, wherein the first path is on an uplink of the apparatus and the second path is on a sidelink of the apparatus; and means for transmitting the uplink communication on the selected path.

In some aspects, an apparatus for wireless communication may include means for selecting, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE; and means for receiving the uplink communication based at least in part on the selected path.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or new radio (NR) radio access technology (RAT), aspects of the present disclosure can be applied to other RATs, such as a 3G RAT, a 4G RAT, and/or a RAT subsequent to 5G (e.g., 6G).

Figure 1:
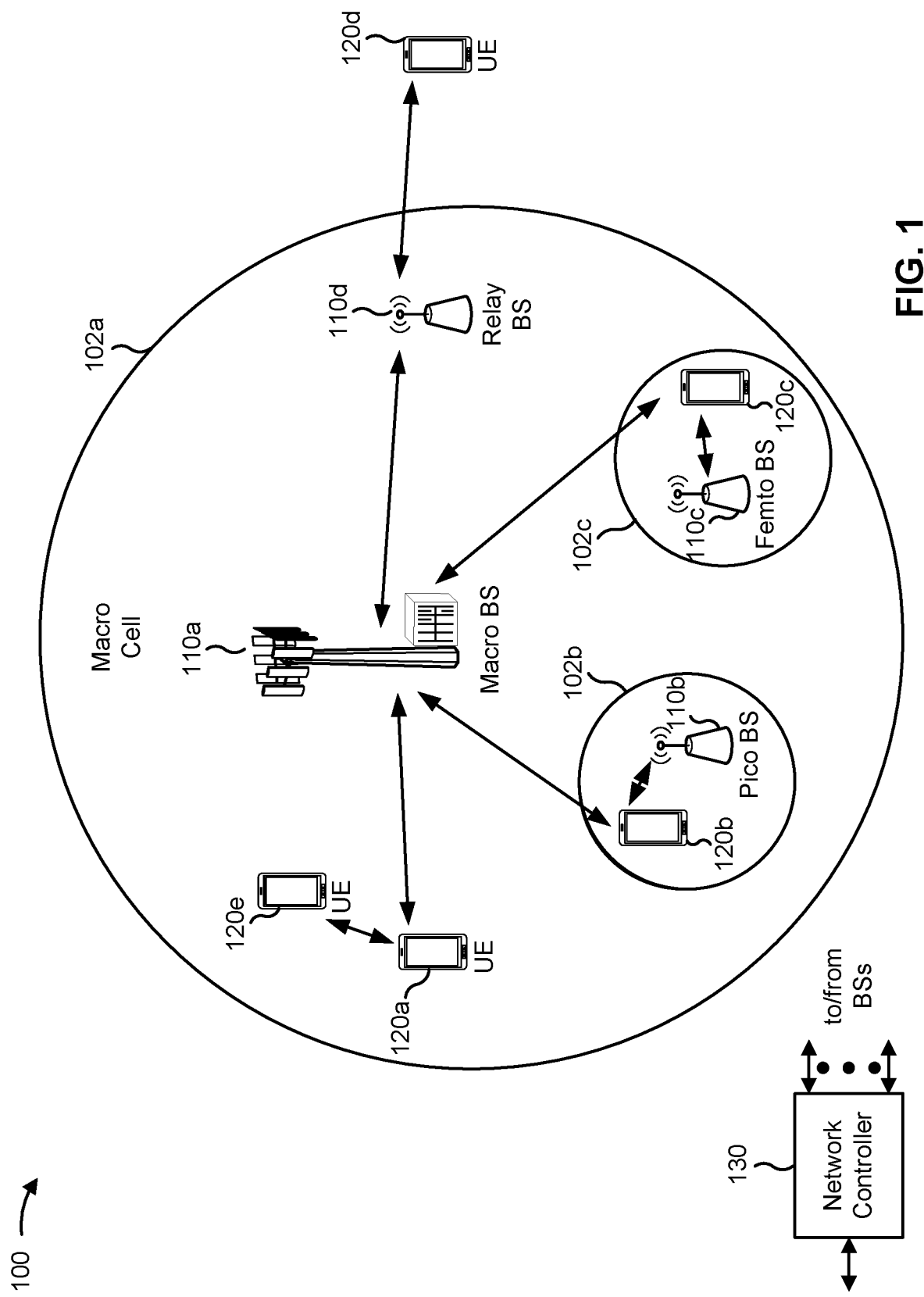
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, a first UE 120 (e.g., UE 120a) may provide a relay service for a second UE (e.g., UE 120e) via a sidelink. For example, sidelink communication can occur between a remote UE 120 (e.g., UE 120e) and a relay UE 120 (e.g., UE 120a) for data transmission to or from the BS 110. In some aspects, the remote UE 120 may be out of the coverage area of the radio access network so that the remote UE 120 cannot communicate directly with the BS 110. In such a case, relays can be deployed to extend network coverage. In some aspects, the remote UE 120 may be within the coverage area of the BS 110. In such a case, the relay UE 120 may improve performance of the remote UE 120 and network capacity by enabling the remote UE to perform sidelink and radio access (e.g., uplink/downlink) communications.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
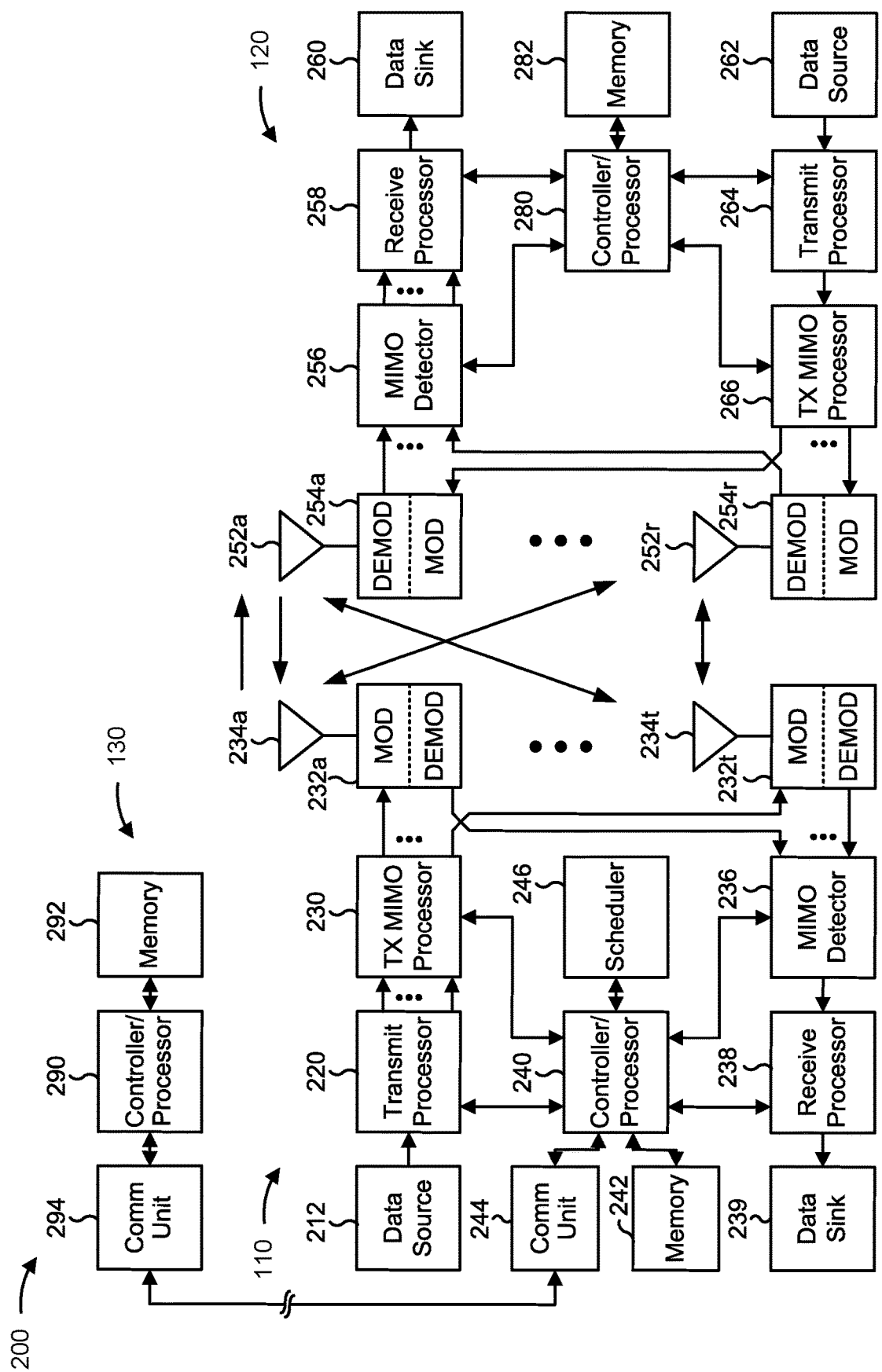
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with path selection for a sidelink relay, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for selecting, from a first path and a second path, a path for an uplink communication associated with at least one of a variable payload size for hybrid automatic repeat request (HARQ) feedback or channel state information (CSI) feedback, wherein the first path is on an uplink of the UE and the second path is on a sidelink of the UE; means for transmitting the uplink communication on the selected path; means for receiving configuration information indicating a rule for selecting the path, wherein the path is selected in accordance with the rule; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for selecting, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE; means for receiving the uplink communication based at least in part on the selected path; means for transmitting downlink control information associated with the CSI feedback or a downlink shared channel associated with the HARQ feedback, wherein a field of the downlink control information indicates the selected path; means for transmitting a downlink control channel relating to the uplink communication, wherein a radio network temporary identifier associated with the downlink control channel indicates the selected path; means for transmitting a downlink control channel relating to the uplink communication, wherein a control resource set associated with the downlink control channel indicates the selected path; means for transmitting downlink control information relating to the uplink communication, wherein a search space associated with a candidate associated with the downlink control information indicates the selected path; means for transmitting configuration information indicating a rule for selecting the path; means for configuring selection of the path via radio resource control signaling; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
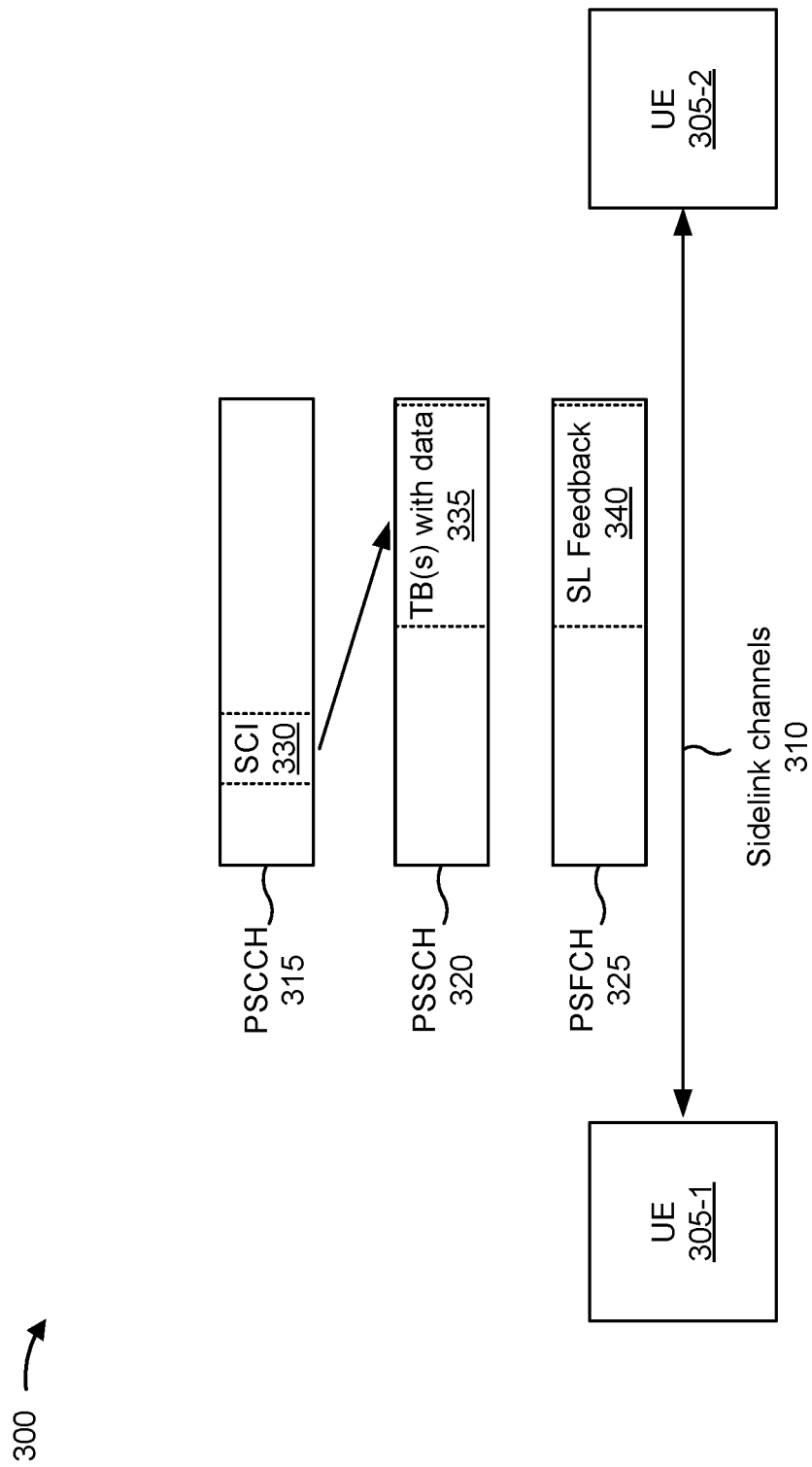
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
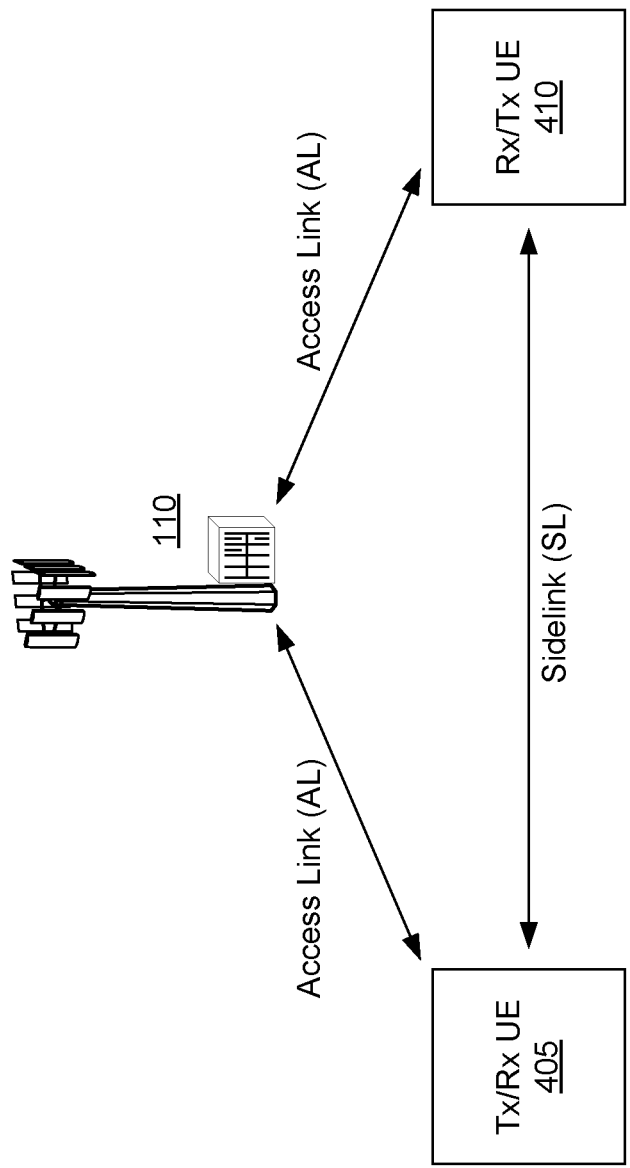
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
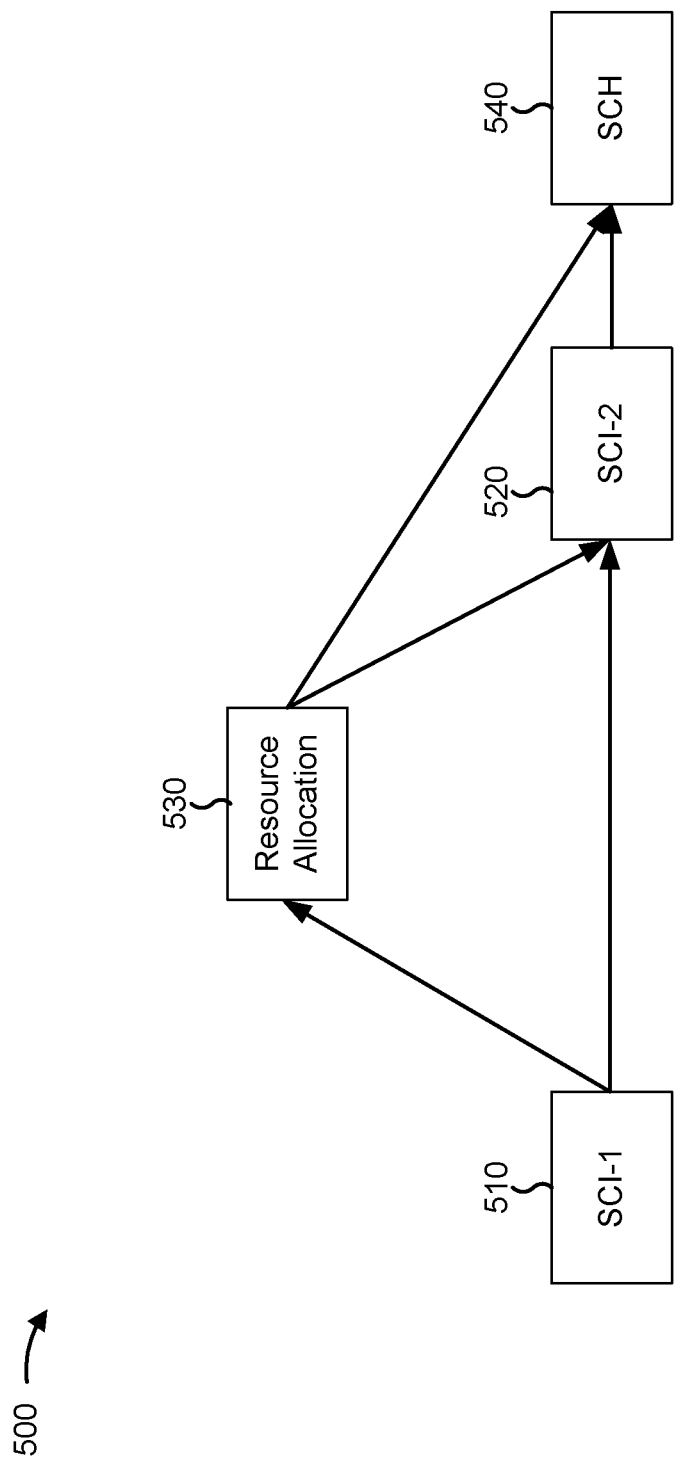
FIG. 5 is a diagram illustrating an example of two-stage sidelink control information, in accordance with the present disclosure.

FIG. 5 is a diagram illustrating an example 500 of two-stage sidelink control information (SCI), in accordance with the present disclosure. SCI may be provided in a first stage and a second stage, shown by reference numbers 510 and 520. The first stage may be referred to as SCI-1 and the second stage may be referred to as SCI-2. SCI-1 may be transmitted on a PSCCH. SCI-1 may include a resource allocation shown by reference number 530, and may include information for decoding SCI-2 (e.g., a format of SCI-2 and/or other information). The resource allocation may indicate resources for SCI-2 and/or a shared channel (SCH) shown by reference number 540. SCI-2 may be transmitted on a PSSCH. SCI-2 may include information for decoding the SCH. SCI-1 and/or SCI-2 may be encoded and/or decoded using a physical downlink control channel (PDCCH) polar coding/decoding chain.

In some aspects, SCI-2 may be mapped to contiguous resource blocks (RBs) in the PSSCH, starting from a first symbol with a PSSCH demodulation reference signal (DMRS). In some aspects, SCI-2 may be scrambled separately from the SCH. In some aspects, SCI-2 may be modulated using quadrature phase shift keying (QPSK). Since the format of SCI-2 may be indicated by SCI-1, a recipient of SCI-2 may not perform blind decoding of SCI-2, thereby conserving computing resources.

As indicated above, FIG. 5 is provided as an example. Other examples may differ from what is described with regard to FIG. 5.

A remote UE may utilize the services of a relay UE to relay communications between the remote UE and a BS. This may be beneficial for cases when coverage of the remote UE is limited, as well as in cases when the remote UE is covered by a radio access network of a BS (e.g., in cases when the remote UE has a Uu link with the BS). For example, if the Uu link is congested, multiple sidelink communications, between remote UEs and the associated relay UEs, can be scheduled. If these multiple sidelink communications do not interfere with each other, network capacity can be increased. Furthermore, in terms of power consumption, since the relay UE may be expected to be closer to the remote UE than the BS is to the remote UE, it may be more desirable if the uplink transmissions are relayed to the BS (since transmitting from the remote UE to the relay UE may use less power than transmitting from the remote UE to the BS). For example, the amount of power needed for each channel may be dependent on the target block error rate (BLER), the payload, and the coding rate. In general, more power is needed for transmitting larger packets, such as an uplink shared channel (UL-SCH) on a PUSCH, than is needed for transmitting smaller packets, such as a set of bits of a hybrid automatic repeat request (HARQ) acknowledgment (ACK) (HARQ-ACK) on the PUCCH.

It may be an inefficient usage of the remote UE's resources to indiscriminately transmit on the uplink or on the sidelink. For example, consider uplink control information (UCI) with a variable payload size. The UCI's payload may vary from a single bit to several hundred bits. Thus, the UE may use significantly more power to transmit a larger payload on the uplink than on the sidelink. As another example, consider aperiodic channel state information (A-CSI) feedback that is not associated with an UL-SCH. In such a case, the BS may not schedule a PUSCH/PSSCH for the UL-SCH, so the remote UE may have no indication of whether to transmit the A-CSI feedback on the uplink or the sidelink.

Some techniques and apparatuses described herein provide selection of a path, from an uplink path and a sidelink path, for transmission by a remote UE of an uplink transmission. For example, the uplink transmission may include UCI with a variable payload, an A-CSI that is not associated with a UL-SCH, or another form of communication. The determination may be performed at the BS and indicated to the remote UE, or may be performed at the remote UE, or a combination thereof. The determination and/or indication may be performed dynamically, or semi-statically. Some techniques and apparatuses described herein provide determination of a path for an uplink configured transmission, such as a scheduling request, a periodic or semi-persistent CSI, a physical uplink shared channel with a configured grant, and/or the like. In this way, power consumption of the remote UE is reduced and reliability of communications between the remote UE and the BS is improved. Furthermore, throughput between the remote UE and the BS is improved.

Figure 6:
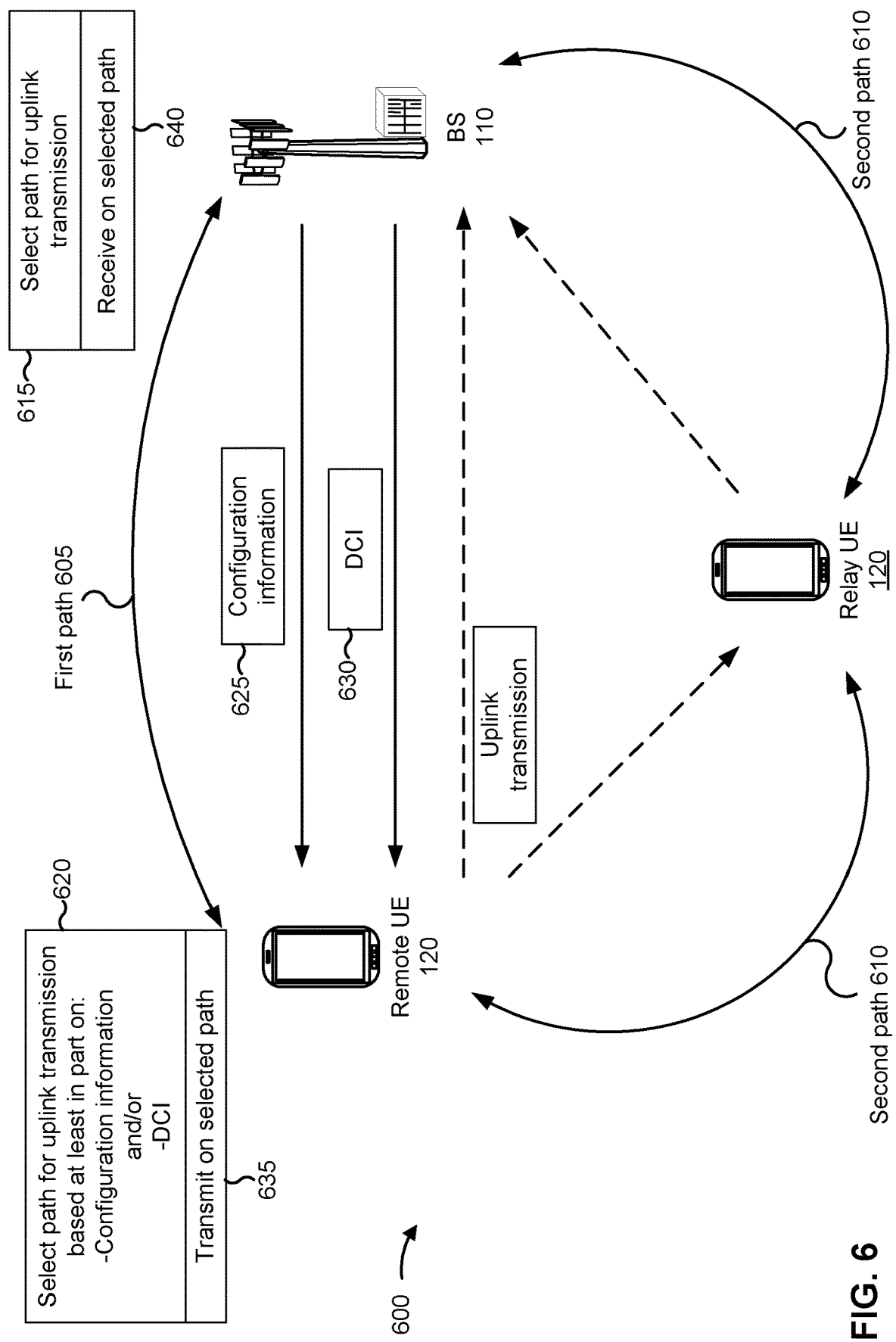
FIG. 6 is a diagram illustrating an example of selection of a path for an uplink communication, in accordance with the present disclosure.

FIG. 6 is a diagram illustrating an example 600 of selection of a path for an uplink communication, in accordance with the present disclosure. As shown, FIG. 6 includes a remote UE (e.g., UE 120 or UE 305), a relay UE (e.g., UE 120 or UE 305), and a BS 110. The remote UE 120 is associated with a first path 605 to the BS 110, which may be a link (e.g., an uplink and/or downlink connection) via a radio access network associated with a Uu interface. The remote UE is associated with a second path 610 to the BS 110. The second path 610 is via the relay UE 120. The second path 610 may be associated with a sidelink interface between the remote UE and the relay UE, such as a PC5 interface. The second path 610 may be associated with a link via the radio access network associated with a Uu interface. The relay UE 120 may include one or more UEs 120 (for example, the remote UE 120 may relay traffic via one relay UE or multiple relay UEs).

As used herein, "selecting a path" may refer to selecting a link for transmission of an uplink communication. For example, the first path 605 may be the uplink (e.g., the communication link directly between the remote UE 120 and the BS 110) and the second path 610 may be the sidelink (e.g., the communication link between the remote UE 120 and the relay UE 120). When the remote UE 120 selects the second path 610, which is equivalent to selecting the sidelink, the remote UE 120 may transmit the uplink communication to the relay UE 120 via the sidelink and the relay UE 120 may forward the uplink communication to the BS 110. When the remote UE 120 selects the first path 605, which is equivalent to selecting the uplink, the remote UE may transmit the uplink communication to the BS 110 via the uplink.

As shown by reference number 615, the BS 110 may select a path for an uplink transmission. The path determined by the BS 110 may be referred to as a selected path. As shown by reference number 620, the remote UE 120 may select the path for the uplink transmission. For example, the BS 110 may select the path and transmit information identifying the selected path to the remote UE 120 and/or the remote UE 120 may select the path (e.g., based at least in part on the information identifying the selected path, based at least in part on a configuration of the remote UE 120, based at least in part on a semi-static rule). Techniques for selecting the path are described below.

The uplink transmission may include UCI associated with a variable payload size (e.g., carrying HARQ-ACK feedback and/or the like), A-CSI feedback that is not associated with a UL-SCH, a configured uplink transmission (e.g., a scheduling request (SR), periodic CSI (P-CSI) feedback, semi-persistent CSI (SP-CSI) feedback, a PUSCH with a configured grant, and/or the like), an initial transmission, a repetition of the initial transmission, and/or the like.

As shown by reference number 625, the BS 110 may provide configuration information to the remote UE 120 (e.g., via the first path 605 and/or the second path 610). The configuration information may include information associated with a configured communication (e.g., an SR, a P-CSI report, an SP-CSI report, a configured PUSCH, and/or the like) or a configuration associated with selecting a path. In some aspects, the configuration information may be transmitted by the BS 110 prior to the BS 110 and/or the UE 120 selecting the path for the uplink transmission. For example, the configuration information may indicate how to select the path, and the UE 120 and/or the BS 110 may select the path in accordance with the configuration information. In some aspects, the configuration information may be provided using radio resource control (RRC) signaling and/or the like. The selection of the path based at least in part on the configuration information may be referred to as semi-static indication or selection of the selected path.

In some aspects, one or more SR configurations may be indicated to be used for transmitting an SR on the first path, and one or more other SR configurations may be indicated to be used for transmitting an SR on the second path. In some aspects, one or more P-CSI/SP-CSI configurations may be indicated to be used for transmitting a P-CSI/SP-CSI report on the first path, while one or more other P-CSI/SP-CSI configurations may be indicated to be used for transmitting a P-CSI/SP-CSI report on the second path.

In some aspects, the remote UE 120 may be configured, based at least in part on the configuration information, with one or more thresholds associated with selecting a path. A threshold may relate to a payload size, a coding rate, a modulation and coding scheme (MCS), a parameter in downlink control information (DCI) relating to the uplink communication (e.g., a timing parameter such as K0, K1, or K2, or a different parameter), a CSI type of the uplink communication, a PUCCH format of the uplink transmission, and/or the like. In some aspects, the configuration information may indicate which path is to be selected. For example, the configuration information may indicate that one of the first path 605 or the second path 610 is to be selected for a given uplink transmission, for a given type of uplink transmissions, for uplink transmissions in a given time window, for uplink transmissions performed after the configuration information is received until update configuration information is received, and/or the like.

In some aspects, the configuration information may indicate a configuration for selecting between the first path 605 and the second path 610 for a configured uplink transmission (e.g., an SR, a P-CSI, an SP/CSI, a PUSCH with a configured grant, and/or the like). For example, the selection of the path may be configured via RRC signaling. In some aspects, for an SR, the selection may be configured for an SR configuration (e.g., for a particular SR configuration, for each SR configuration, and/or the like). In some aspects, for an SR, the selection of the path may be based at least in part on a configured priority level associated with an SR configuration of the SR. For example, the first path 605 may be selected for a first priority level (e.g., a higher priority level) and the second path 610 may be selected for a second priority level (e.g., a lower priority level). In some aspects, for a configured grant PUSCH (CG-PUSCH), the selection may be configured for a CG-PUSCH configuration (e.g., for a particular CG-PUSCH configuration, for each CG-PUSCH configuration, and/or the like). In some aspects, for a CG-PUSCH, the selection of the path may be based at least in part on a configured priority level associated with a CG-PUSCH configuration of the CG-PUSCH. For example, the first path 605 may be selected for a first priority level (e.g., a higher priority level) and the second path 610 may be selected for a second priority level (e.g., a lower priority level). In some aspects, for a P-CSI or a SP-CSI, the selected path may be configured. Additionally, or alternatively, the selected path may be selected based at least in part on a configured priority level associated with the P-CSI or the SP-CSI, similarly to what is described with regard to the SR and the CG-PUSCH.

As shown by reference number 630, the BS 110 may provide DCI to the UE 120. In some aspects, the DCI may relate to the uplink communication. For example, the DCI may include scheduling information for the uplink communication. In some aspects, the DCI may not directly relate to the uplink communication. For example, the DCI may be used to indicate a selected path for an uplink communication that is not scheduled by the DCI. In some aspects, the UE 120 may select the path for the uplink communication based at least in part on the DCI. Selecting the path for the uplink communication based at least in part on the DCI may be referred to herein as dynamic selection or determination of the selected path.

In some aspects, the path may be selected based at least in part on information included in the DCI. For example, a bit field of the DCI (e.g., a DCI 0-X format for A-CSI and/or a DCI 1-X format for PDSCH scheduling) may indicate whether the first path 605 or the second path 610 is to be used for a corresponding uplink transmission.

In some aspects, the path may be selected based at least in part on a radio network temporary identifier (RNTI) associated with the DCI. For example, if a PDCCH associated with the DCI is decoded using a first RNTI, then the UE 120 may select the first path 605 for a corresponding uplink transmission, and if the PDCCH associated with the DCI is decoded using a second RNTI, then the UE 120 may select the second path 610 for a corresponding uplink transmission.

In some aspects, the path may be selected based at least in part on a control resource set (CORESET) associated with the DCI. For example, if the DCI is in a first CORESET or a first set of CORESETs, then the UE 120 may select the first path 605 for a corresponding uplink transmission, and if the DCI is in a second CORESET or a second set of CORESETs, then the UE 120 may select the second path 610 for the corresponding uplink transmission.

In some aspects, the path may be selected based at least in part on a search space associated with a candidate on which the DCI is transmitted. For example, if the DCI is transmitted or decoded in a first search space set, then the UE 120 may select the first path 605 for a corresponding uplink transmission, and if the DCI is transmitted or decoded in a second search space set, then the UE 120 may select the second path 610 for the corresponding uplink transmission. If a candidate is shared between two or more search spaces, then the UE 120 may select the path based at least in part on a rule, such as a priority rule. For example, a DCI detected on a shared candidate may be selected for the first path 605 or the second path 610 based at least in part on the rule. In some aspects, the priority rule may be fixed or modified by the configuration information shown by reference number 625.

In some aspects, the path may be selected based at least in part on a DCI size. For example, a first DCI size or range of DCI sizes may correspond to the first path 605 and a second DCI size or range of DCI sizes may correspond to the second path 610. As another example, a DCI with a size that satisfies a threshold may correspond to the first path 605 and a DCI with a size that fails to satisfy the threshold may correspond to the second path 610.

In some aspects, the path may be selected based at least in part on a DCI format. For example, the DCI format may be associated with reporting on the sidelink. If the remote UE 120 receives DCI, corresponding to the uplink transmission, that uses the DCI format, the remote UE 120 may select the second path 610 for the uplink transmission. If the DCI format is size aligned with another DCI format (e.g., a DCI format associated with scheduling an uplink communication on the first path 605), and the remote UE 120 is configured to monitor the two DCI formats in search space sets associated with a same CORESET, then the remote UE 120 may select the path according to one or more of the rules described elsewhere herein.

In some aspects, the path may be selected based at least in part on a priority level indicated by the DCI. For example, an uplink transmission associated with a first priority level may be transmitted on the first path 605, and an uplink transmission associated with a second priority level may be transmitted on the second path 610. In some aspects, the first priority level may be a higher priority level, and transmissions associated with the first priority level may be transmitted via the first path 605 so that latency associated with such transmissions is reduced relative to being relayed via the relay UE 120. In some aspects, an uplink channel may be associated with a priority level. For example, a PUCCH carrying HARQ-ACK feedback may be assigned a HARQ-ACK codebook that is associated with a configured priority. As another example, a dynamic grant PUSCH (DG-PUSCH) 's priority level may be indicated in the corresponding DCI. As yet another example, an uplink transmission comprising a downlink-triggered CSI report may be associated with a priority level that is indicated in the corresponding DCI. The UE 120 may select the path based at least in part on the priority level associated with the uplink communication. In some aspects, the DCI may include a bit field (e.g., a bit or multiple bits) indicating which path should be selected.

As shown by reference number 635, the remote UE 120 may transmit the uplink transmission on the selected path. As shown by reference number 640, the BS 110 may receive the uplink transmission on the selected path. Thus the remote UE 120 and/or the BS 110 may select a path for an uplink transmission from the first path 605 and the second path 610, which improves resource utilization of the remote UE 120 and the BS 110, reduces power consumption of the remote UE 120, and improves coverage and performance of the remote UE 120 and/or the BS 110.

In some aspects, the remote UE 120 may select a first path for a first transmission and a second path for a second transmission. For example, the remote UE 120 may select a first path for an initial transmission of a communication and a second path for a retransmission of the communication, which improves diversity of the communication, thereby increasing the likelihood that the communication is successfully received by the BS 110.

As indicated above, FIG. 6 is provided as an example. Other examples may differ from what is described with respect to FIG. 6.

Figure 7:
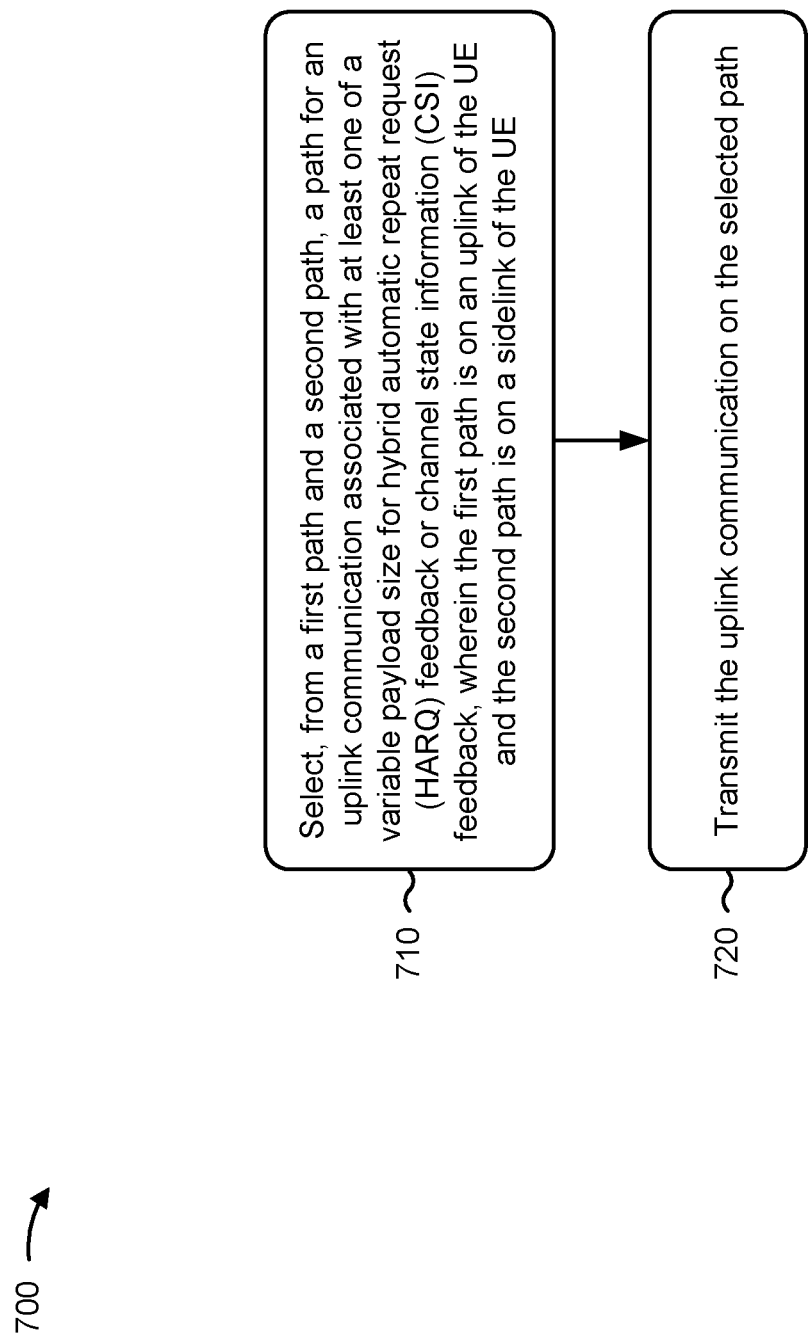
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120, remote UE 120, UE 305 and/or the like) performs operations associated with path selection for a sidelink relay.

As shown in FIG. 7, in some aspects, process 700 may include selecting, from a first path and a second path, a path for an uplink communication associated with at least one of a variable payload size for hybrid automatic repeat request (HARD) feedback or channel state information (CSI) feedback, wherein the first path is on an uplink of the UE and the second path is on a sidelink of the UE (block 710). For example, the UE (e.g., using antenna 252, DEMOD 254, MIMO detector 256, receive processor 258, controller/ processor 280, and/or the like) may select, from a first path and a second path, a path for an uplink communication associated with at least one of a variable payload size for HARQ feedback or CSI feedback, as described above. In some aspects, the first path is on an uplink of the UE and the second path is on a sidelink of the UE. The sidelink may be a link to another UE, such as a dedicated relay. The other UE may receive the uplink communication on the second path, and may forward the uplink communication to a base station.

As further shown in FIG. 7, in some aspects, process 700 may include transmitting the uplink communication on the selected path (block 720). For example, the UE (e.g., using controller/processor 280, transmit processor 264, TX MIMO processor 266, MOD 254, antenna 252, and/or the like) may transmit the uplink communication on the selected path, as described above.

Process 700 may include additional aspects, such as any single aspect or any combination of aspects described below and/or in connection with one or more other processes described elsewhere herein.

In a first aspect, selecting the path for the uplink communication is based at least in part on a dynamic determination.

In a second aspect, alone or in combination with the first aspect, selecting the path for the uplink communication further comprises selecting the path based at least in part on a field of downlink control information associated with the CSI feedback or a downlink shared channel associated with the HARQ feedback.

In a third aspect, alone or in combination with one or more of the first and second aspects, selecting the path for the uplink communication further comprises selecting the path based at least in part on a radio network temporary identifier associated with a downlink control channel relating to the uplink communication.

In a fourth aspect, alone or in combination with one or more of the first through third aspects, selecting the path for the uplink communication further comprises selecting the path based at least in part on a control resource set associated with a downlink control channel relating to the uplink communication.

In a fifth aspect, alone or in combination with one or more of the first through fourth aspects, selecting the path for the uplink communication further comprises selecting the path based at least in part on a search space associated with a candidate associated with downlink control information relating to the uplink communication.

In a sixth aspect, alone or in combination with one or more of the first through fifth aspects, when the candidate is associated with two or more search spaces, selecting the path for the uplink communication further comprises selecting the path based at least in part on a priority rule.

In a seventh aspect, alone or in combination with one or more of the first through sixth aspects, the priority rule is configured using radio resource control signaling.

In an eighth aspect, alone or in combination with one or more of the first through seventh aspects, selecting the path for the uplink communication further comprises selecting the path based at least in part on a size of downlink control information relating to the uplink communication.

In a ninth aspect, alone or in combination with one or more of the first through eighth aspects, selecting the path for the uplink communication further comprises selecting the path based at least in part on a format of downlink control information relating to the uplink communication, and the format is specific to sidelink reporting.

In a tenth aspect, alone or in combination with one or more of the first through ninth aspects, when the format of downlink control information is indistinguishable from another format of downlink control information, selecting the path for the uplink communication further comprises selecting the path based at least in part on a priority rule.

In an eleventh aspect, alone or in combination with one or more of the first through tenth aspects, selecting the path for the uplink communication further comprises selecting the path based at least in part on a priority level associated with the uplink communication.

In a twelfth aspect, alone or in combination with one or more of the first through eleventh aspects, the priority level is associated with a HARQ codebook or a scheduling request configuration associated with the uplink communication.

In a thirteenth aspect, alone or in combination with one or more of the first through twelfth aspects, the priority level is indicated by uplink downlink control information that triggers the CSI feedback.

In a fourteenth aspect, alone or in combination with one or more of the first through thirteenth aspects, the first path is selected when the priority level is associated with a first priority and the second path is selected when the priority level is associated with a second priority, where the first priority is higher than the second priority.

In a fifteenth aspect, alone or in combination with one or more of the first through fourteenth aspects, process 700 includes receiving configuration information indicating a rule for selecting the path, wherein the path is being selected in accordance with the rule.

In a sixteenth aspect, alone or in combination with one or more of the first through fifteenth aspects, the rule is based at least in part on a threshold payload size.

In a seventeenth aspect, alone or in combination with one or more of the first through sixteenth aspects, the rule is based at least in part on a threshold coding rate.

In an eighteenth aspect, alone or in combination with one or more of the first through seventeenth aspects, the rule is based at least in part on a modulation and coding scheme index.

In a nineteenth aspect, alone or in combination with one or more of the first through eighteenth aspects, the rule is based at least in part on a parameter in downlink control information relating to the uplink communication.

In a twentieth aspect, alone or in combination with one or more of the first through nineteenth aspects, the rule indicates that a particular path is to be selected.

In a twenty-first aspect, alone or in combination with one or more of the first through twentieth aspects, the rule is based at least in part on a CSI type of the CSI feedback.

In a twenty-second aspect, alone or in combination with one or more of the first through twenty-first aspects, the uplink communication is associated with a configured uplink transmission, and the selection of the path is configured via radio resource control signaling.

In a twenty-third aspect, alone or in combination with one or more of the first through twenty-second aspects, when the configured uplink transmission is associated with a scheduling request or a configured grant physical uplink shared channel (CG-PUSCH), the selection is configured per scheduling request configuration or per CG-PUSCH transmission.

In a twenty-fourth aspect, alone or in combination with one or more of the first through twenty-third aspects, when the configured uplink transmission is associated with a scheduling request or a CG-PUSCH, the selection is based at least in part on a priority level of the scheduling request or the CG-PUSCH.

In a twenty-fifth aspect, alone or in combination with one or more of the first through twenty-fourth aspects, when the configured uplink transmission is associated with the CSI feedback, the selection is based at least in part on a priority level of the CSI feedback or a configured path for the CSI feedback.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
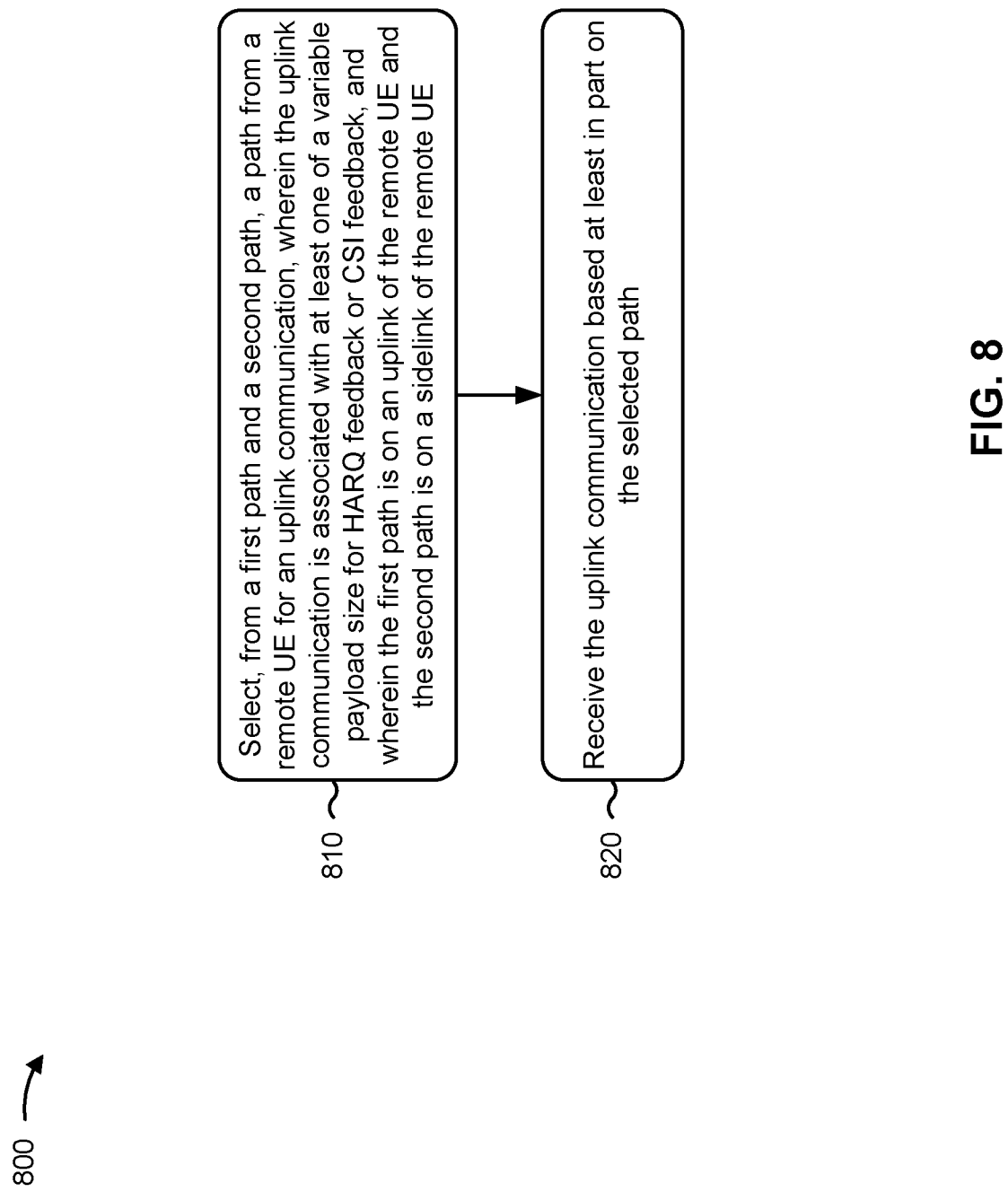
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., BS 110 and/or the like) performs operations associated with path selection for a sidelink relay.

As shown in FIG. 8, in some aspects, process 800 may include selecting, from a first path and a second path, a path from a remote UE for an uplink communication, wherein the uplink communication is associated with at least one of a variable payload size for HARQ feedback or CSI feedback, and wherein the first path is on an uplink of the remote UE and the second path is on a sidelink of the remote UE (block 810). For example, the base station (e.g., using antenna 234, DEMOD 232, MIMO detector 236, receive processor 238, controller/processor 240, and/or the like) may select, from a first path and a second path, a path from a remote UE for an uplink communication, as described above. In some aspects, the uplink communication is associated with at least one of a variable payload size for HARQ feedback or CSI feedback. In some aspects, the first path is on an uplink of the remote UE and the second path is on a sidelink of the remote UE.

As further shown in FIG. 8, in some aspects, process 800 may include receiving the uplink communication based at least in part on the selected path (block 820). For example, the UE (e.g., using antenna 252, DEMOD 254, MIMO detector 256, receive processor 258, controller/processor 280, and/or the like) may receive the uplink communication based at least in part on the selected path, as described above.

Process 800 may include additional aspects, such as any single aspect or any combination of aspects described below and/or in connection with one or more other processes described elsewhere herein.

In a first aspect, process 800 includes transmitting downlink control information associated with the CSI feedback or a downlink shared channel associated with the HARQ feedback, wherein a field of the downlink control information indicates the selected path.

In a second aspect, alone or in combination with the first aspect, process 800 includes transmitting a downlink control channel relating to the uplink communication, wherein a radio network temporary identifier associated with the downlink control channel indicates the selected path.

In a third aspect, alone or in combination with one or more of the first and second aspects, process 800 includes transmitting a downlink control channel relating to the uplink communication, wherein a control resource set associated with the downlink control channel indicates the selected path.

In a fourth aspect, alone or in combination with one or more of the first through third aspects, process 800 includes transmitting downlink control information relating to the uplink communication, wherein a search space associated with a candidate associated with the downlink control information indicates the selected path.

In a fifth aspect, alone or in combination with one or more of the first through fourth aspects, when the candidate is associated with two or more search spaces, selecting the path for the uplink communication further comprises selecting the path based at least in part on a priority rule.

In a sixth aspect, alone or in combination with one or more of the first through fifth aspects, the priority rule is configured using radio resource control signaling.

In a seventh aspect, alone or in combination with one or more of the first through sixth aspects, a size of downlink control information relating to the uplink communication indicates the selected path.

In an eighth aspect, alone or in combination with one or more of the first through seventh aspects, a format of downlink control information relating to the uplink communication indicates the selected path, and the format is specific to sidelink reporting.

In a ninth aspect, alone or in combination with one or more of the first through eighth aspects, when the format of downlink control information is indistinguishable from another format of downlink control information, the selected path is determined based at least in part on a priority rule.

In a tenth aspect, alone or in combination with one or more of the first through ninth aspects, selecting the path for the uplink communication further comprises selecting the path based at least in part on a priority level associated with the uplink communication.

In an eleventh aspect, alone or in combination with one or more of the first through tenth aspects, the priority level is associated with a HARQ codebook or a scheduling request configuration associated with the uplink communication.

In a twelfth aspect, alone or in combination with one or more of the first through eleventh aspects, the priority level is indicated by uplink downlink control information that triggers the CSI feedback.

In a thirteenth aspect, alone or in combination with one or more of the first through twelfth aspects, the first path is determined when the priority level is associated with a first priority and the second path is determined when the priority level is associated with a second priority, wherein the first priority is higher than the second priority.

In a fourteenth aspect, alone or in combination with one or more of the first through thirteenth aspects, process 800 includes transmitting configuration information indicating a rule for selecting the path.

In a fifteenth aspect, alone or in combination with one or more of the first through fourteenth aspects, the rule is based at least in part on a threshold payload size.

In a sixteenth aspect, alone or in combination with one or more of the first through fifteenth aspects, the rule is based at least in part on a threshold coding rate.

In a seventeenth aspect, alone or in combination with one or more of the first through sixteenth aspects, the rule is based at least in part on a modulation and coding scheme index.

In an eighteenth aspect, alone or in combination with one or more of the first through seventeenth aspects, the rule is based at least in part on a parameter in downlink control information relating to the uplink communication.

In a nineteenth aspect, alone or in combination with one or more of the first through eighteenth aspects, the rule indicates that a particular path is to be selected.

In a twentieth aspect, alone or in combination with one or more of the first through nineteenth aspects, the rule is based at least in part on a CSI type of the CSI feedback.

In a twenty-first aspect, alone or in combination with one or more of the first through twentieth aspects, the uplink communication is associated with a configured uplink transmission, and the method further comprises configuring selection of the path via radio resource control signaling.

In a twenty-second aspect, alone or in combination with one or more of the first through twenty-first aspects, when the configured uplink transmission is associated with a scheduling request or a CG-PUSCH, the selection is configured per scheduling request configuration or per CG-PUSCH transmission.

In a twenty-third aspect, alone or in combination with one or more of the first through twenty-second aspects, when the configured uplink transmission is associated with a scheduling request or a CG-PUSCH, the selection is based at least in part on a priority level of the scheduling request or the CG-PUSCH.

In a twenty-fourth aspect, alone or in combination with one or more of the first through twenty-third aspects, when the configured uplink transmission is associated with the CSI feedback, the selection is based at least in part on a priority level of the CSI feedback or a configured path for the CSI feedback.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: selecting, from a first path and a second path, a path for an uplink communication associated with at least one of a variable payload size for hybrid automatic repeat request (HARQ) feedback or channel state information (CSI) feedback, wherein the first path is on an uplink of the UE and the second path is on a sidelink of the UE; and transmitting the uplink communication on the selected path.

Aspect 2: The method of Aspect 1, wherein selecting the path for the uplink communication is based at least in part on a dynamic determination.

Aspect 3: The method of any of Aspects 1-2, wherein selecting the path for the uplink communication further comprises selecting the path based at least in part on a field of downlink control information associated with the CSI feedback or a downlink shared channel associated with the HARQ feedback.

Aspect 4: The method of any of Aspects 1-3, wherein selecting the path for the uplink communication further comprises selecting the path based at least in part on a radio network temporary identifier associated with a downlink control channel relating to the uplink communication.

Aspect 5: The method of any of Aspects 1-4, wherein selecting the path for the uplink communication further comprises selecting the path based at least in part on a control resource set associated with a downlink control channel relating to the uplink communication.

Aspect 6: The method of any of Aspects 1-5, wherein selecting the path for the uplink communication further comprises selecting the path based at least in part on a search space associated with a candidate associated with downlink control information relating to the uplink communication.

Aspect 7: The method of Aspect 6, wherein, when the candidate is associated with two or more search spaces, selecting the path for the uplink communication further comprises selecting the path based at least in part on a priority rule.

Aspect 8: The method of Aspect 7, wherein the priority rule is configured using radio resource control signaling.

Aspect 9: The method of any of Aspects 1-8, wherein selecting the path for the uplink communication further comprises selecting the path based at least in part on a size of downlink control information relating to the uplink communication.

Aspect 10: The method of any of Aspects 1-9, wherein selecting the path for the uplink communication further comprises selecting the path based at least in part on a format of downlink control information relating to the uplink communication, wherein the format is specific to sidelink reporting.

Aspect 11: The method of Aspect 10, wherein, when the format of downlink control information is indistinguishable from another format of downlink control information, selecting the path for the uplink communication further comprises selecting the path based at least in part on a priority rule.

Aspect 12: The method of any of Aspects 1-11, wherein selecting the path for the uplink communication further comprises selecting the path based at least in part on a priority level associated with the uplink communication.

Aspect 13: The method of Aspect 12, wherein the priority level is associated with a HARQ codebook or a scheduling request configuration associated with the uplink communication.

Aspect 14: The method of Aspect 12, wherein the priority level is indicated by uplink downlink control information that triggers the CSI feedback.

Aspect 15: The method of Aspect 12, wherein the first path is selected when the priority level is associated with a first priority and the second path is selected when the priority level is associated with a second priority, wherein the first priority is higher than the second priority.

Aspect 16: The method of any of Aspects 1-15, further comprising: receiving configuration information indicating a rule for selecting the path, wherein the path is selected in accordance with the rule.

Aspect 17: The method of Aspect 16, wherein the rule is based at least in part on a threshold payload size.

Aspect 18: The method of Aspect 16, wherein the rule is based at least in part on a threshold coding rate.

Aspect 19: The method of Aspect 16, wherein the rule is based at least in part on a modulation and coding scheme (MCS) index.

Aspect 20: The method of Aspect 16, wherein the rule is based at least in part on a parameter in downlink control information relating to the uplink communication.

Aspect 21: The method of Aspect 16, wherein the rule indicates that a particular path is to be selected.

Aspect 22: The method of Aspect 16, wherein the rule is based at least in part on a CSI type of the CSI feedback.

Aspect 23: The method of any of Aspects 1-22, wherein the uplink communication is associated with a configured uplink transmission, and wherein the selection of the path is configured via radio resource control signaling.

Aspect 24: The method of Aspect 23, wherein, when the configured uplink transmission is associated with a scheduling request or a configured grant physical uplink shared channel (CG-PUSCH), the selection is configured per scheduling request configuration or per CG-PUSCH transmission.

Aspect 25: The method of Aspect 23, wherein, when the configured uplink transmission is associated with a scheduling request or a configured grant physical uplink shared channel (CG-PUSCH), the selection is based at least in part on a priority level of the scheduling request or the CG-PUSCH.

Aspect 26: The method of Aspect 23, wherein, when the configured uplink transmission is associated with the CSI feedback, the selection is based at least in part on a priority level of the CSI feedback or a configured path for the CSI feedback.

Aspect 27: A method of wireless communication performed by a base station, comprising: selecting, from a first path and a second path, a path from a remote user equipment (UE) for an uplink communication, wherein the uplink communication is associated with at least one of a variable payload size for hybrid automatic repeat request (HARQ) feedback or channel state information (CSI) feedback, and wherein the first path is on an uplink of the remote UE and the second path is on a sidelink of the remote UE; and receiving the uplink communication based at least in part on the selected path.

Aspect 28: The method of Aspect 27, further comprising: transmitting downlink control information associated with the CSI feedback or a downlink shared channel associated with the HARQ feedback, wherein a field of the downlink control information indicates the selected path.

Aspect 29: The method of any of Aspects 27-28, further comprising: transmitting a downlink control channel relating to the uplink communication, wherein a radio network temporary identifier associated with the downlink control channel indicates the selected path.

Aspect 30: The method of any of Aspects 27-29, further comprising: transmitting a downlink control channel relating to the uplink communication, wherein a control resource set associated with the downlink control channel indicates the selected path.

Aspect 31: The method of any of Aspects 27-30, further comprising: transmitting downlink control information relating to the uplink communication, wherein a search space associated with a candidate associated with the downlink control information indicates the selected path.

Aspect 32: The method of Aspect 31, wherein, when the candidate is associated with two or more search spaces, selecting the path for the uplink communication further comprises selecting the path based at least in part on a priority rule.

Aspect 33: The method of Aspect 32, wherein the priority rule is configured using radio resource control signaling.

Aspect 34: The method of any of Aspects 27-33, wherein a size of downlink control information relating to the uplink communication indicates the selected path.

Aspect 35: The method of any of Aspects 27-34, wherein a format of downlink control information relating to the uplink communication indicates the selected path, wherein the format is specific to sidelink reporting.

Aspect 36: The method of Aspect 35, wherein, when the format of downlink control information is indistinguishable from another format of downlink control information, the selected path is determined based at least in part on a priority rule.

Aspect 37: The method of any of Aspects 27-36, wherein selecting the path for the uplink communication further comprises selecting the path based at least in part on a priority level associated with the uplink communication.

Aspect 38: The method of Aspect 37, wherein the priority level is associated with a HARQ codebook or a scheduling request configuration associated with the uplink communication.

Aspect 39: The method of Aspect 37, wherein the priority level is indicated by uplink downlink control information that triggers the CSI feedback.

Aspect 40: The method of Aspect 37, wherein the first path is determined when the priority level is associated with a first priority and the second path is determined when the priority level is associated with a second priority, wherein the first priority is higher than the second priority.

Aspect 41: The method of any of Aspects 27-40, further comprising: transmitting configuration information indicating a rule for selecting the path.

Aspect 42: The method of Aspect 41, wherein the rule is based at least in part on a threshold payload size.

Aspect 43: The method of Aspect 41, wherein the rule is based at least in part on a threshold coding rate.

Aspect 44: The method of Aspect 41, wherein the rule is based at least in part on a modulation and coding scheme (MCS) index.

Aspect 45: The method of Aspect 41, wherein the rule is based at least in part on a parameter in downlink control information relating to the uplink communication.

Aspect 46: The method of Aspect 41, wherein the rule indicates that a particular path is to be selected.

Aspect 47: The method of Aspect 41, wherein the rule is based at least in part on a CSI type of the CSI feedback.

Aspect 48: The method of any of Aspects 27-47, wherein the uplink communication is associated with a configured uplink transmission, and wherein the method further comprises: configuring selection of the path via radio resource control signaling.

Aspect 49: The method of Aspect 48, wherein, when the configured uplink transmission is associated with a scheduling request or a configured grant physical uplink shared channel (CG-PUSCH), the selection is configured per scheduling request configuration or per CG-PUSCH transmission.

Aspect 50: The method of Aspect 48, wherein, when the configured uplink transmission is associated with a scheduling request or a configured grant physical uplink shared channel (CG-PUSCH), the selection is based at least in part on a priority level of the scheduling request or the CG-PUSCH.

Aspect 51: The method of Aspect 48, wherein, when the configured uplink transmission is associated with the CSI feedback, the selection is based at least in part on a priority level of the CSI feedback or a configured path for the CSI feedback.

Aspect 52: An apparatus for wireless communication at a device, comprising a processor; memory coupled with the processor; and instructions stored in the memory and executable by the processor to cause the apparatus to perform the method of one or more Aspects of Aspects 1-51.

Aspect 53: A device for wireless communication, comprising a memory and one or more processors coupled to the memory, the memory and the one or more processors configured to perform the method of one or more Aspects of Aspects 1-51.

Aspect 54: An apparatus for wireless communication, comprising at least one means for performing the method of one or more Aspects of Aspects 1-51.

Aspect 55: A non-transitory computer-readable medium storing code for wireless communication, the code comprising instructions executable by a processor to perform the method of one or more Aspects of Aspects 1-51.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 1-51.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   selecting, from a first path and a second path, the first path for an uplink communication associated with at least one of a variable payload size for hybrid automatic repeat request (HARQ) feedback or channel state information (CSI) feedback, wherein the first path is on an uplink of the UE and the second path is on a sidelink of the UE;
   selecting, from the first path and the second path, the second path for a retransmission of the uplink communication; and
   transmitting the uplink communication on the first path, wherein the retransmission of the uplink communication is performed on the second path when a transmission of the uplink communication on the first path is unsuccessful.

2. The method of claim 1, wherein selecting the first path for the uplink communication is based at least in part on a dynamic determination.

3. The method of claim 1, wherein selecting the first path for the uplink communication further comprises selecting the first path based at least in part on a field of downlink control information associated with the CSI feedback or a downlink shared channel associated with the HARQ feedback.

4. The method of claim 1, wherein selecting the first path for the uplink communication further comprises selecting the first path based at least in part on a radio network temporary identifier associated with a downlink control channel relating to the uplink communication.

5. The method of claim 1, wherein selecting the first path for the uplink communication further comprises selecting the first path based at least in part on a control resource set associated with a downlink control channel relating to the uplink communication.

6. The method of claim 1, wherein selecting the first path for the uplink communication further comprises selecting the first path based at least in part on a search space associated with a candidate associated with downlink control information relating to the uplink communication.

7. The method of claim 6, wherein, when the candidate is associated with two or more search spaces, selecting the first path for the uplink communication further comprises selecting the first path based at least in part on a priority rule.

8. The method of claim 1, wherein selecting the first path for the uplink communication further comprises selecting the first path based at least in part on a size of downlink control information relating to the uplink communication.

9. The method of claim 1, wherein selecting the first path for the uplink communication further comprises selecting the first path based at least in part on a format of downlink control information relating to the uplink communication, wherein the format is specific to sidelink reporting.

10. The method of claim 9, wherein, when the format of downlink control information is indistinguishable from another format of downlink control information, selecting the first path for the uplink communication further comprises selecting the first path based at least in part on a priority rule.

11. The method of claim 1, wherein selecting the first path for the uplink communication further comprises selecting the first path based at least in part on a priority level associated with the uplink communication.

12. The method of claim 11, wherein the priority level is associated with a HARQ codebook or a scheduling request configuration associated with the uplink communication.

13. The method of claim 11, wherein the priority level is indicated by downlink control information that triggers the CSI feedback.

14. The method of claim 11, wherein the first path is selected when the priority level is associated with a first priority and the second path is selected when the priority level is associated with a second priority, wherein the first priority is higher than the second priority.

15. The method of claim 1, further comprising:
   receiving configuration information indicating a rule for selecting a path for the uplink communication, wherein the first path is selected for the uplink communication in accordance with the rule.

16. The method of claim 15, wherein the rule is based at least in part on at least one of:
   a threshold payload size,
   a threshold coding rate,
   a modulation and coding scheme (MCS) index, or
   a CSI type of the CSI feedback.

17. The method of claim 15, wherein the rule is based at least in part on a parameter in downlink control information relating to the uplink communication.

18. The method of claim 15, wherein the rule indicates that a particular path is to be selected.

19. The method of claim 1, wherein the uplink communication is associated with a configured uplink transmission, and wherein the selection of a path for the uplink communication is configured via radio resource control signaling.

20. The method of claim 19, wherein, when the configured uplink transmission is associated with a scheduling request or a configured grant physical uplink shared channel (CG-PUSCH), the selection is configured per scheduling request configuration or per CG-PUSCH transmission.

21. The method of claim 19, wherein, when the configured uplink transmission is associated with a scheduling request or a configured grant physical uplink shared channel (CG-PUSCH), the selection is based at least in part on a priority level of the scheduling request or the CG-PUSCH.

22. The method of claim 19, wherein, when the configured uplink transmission is associated with the CSI feedback, the selection is based at least in part on a priority level of the CSI feedback or a configured path for the CSI feedback.

23. A method of wireless communication performed by a base station, comprising:
   selecting, from a first path and a second path, the first path from a remote user equipment (UE) for an uplink communication, wherein the uplink communication is associated with at least one of a variable payload size for hybrid automatic repeat request (HARQ) feedback or channel state information (CSI) feedback, and wherein the first path is on an uplink of the remote UE and the second path is on a sidelink of the remote UE;

selecting, from the first path and the second path, the second path for a retransmission of the uplink communication; and receiving the uplink communication based at least in part on the selected first path or the retransmission of the uplink communication based at least in part on the selected second path.

24. The method of claim 23, wherein a candidate is associated with downlink control information relating to the uplink communication, and wherein, when the candidate is associated with two or more search spaces, selecting the first path for the uplink communication further comprises selecting the first path based at least in part on a priority rule.

25. The method of claim 23, further comprising:
transmitting configuration information indicating a rule for selecting a path for the uplink communication.

26. A user equipment (UE) for wireless communication, comprising:
a memory; and
one or more processors coupled to the memory, the one or more processors configured to:
select, from a first path and a second path, the first path for an uplink communication associated with at least one of a variable payload size for hybrid automatic repeat request (HARQ) feedback or channel state information (CSI) feedback, wherein the first path is on an uplink of the UE and the second path is on a sidelink of the UE;
select, from the first path and the second path, the second path for a retransmission of the uplink communication; and
transmit the uplink communication on the first path, wherein the retransmission of the uplink communication is performed on the second path when a transmission of the uplink communication on the first path is unsuccessful.

27. The UE of claim 26, wherein selecting the first path for the uplink communication is based at least in part on a dynamic determination.

28. The UE of claim 26, wherein selecting the first path for the uplink communication is based at least in part on a radio network temporary identifier associated with a downlink control channel relating to the uplink communication.

29. A base station for wireless communication, comprising:
a memory; and
one or more processors coupled to the memory, the one or more processors configured to:
select, from a first path and a second path, the first path from a remote user equipment (UE) for an uplink communication, wherein the uplink communication is associated with at least one of a variable payload size for hybrid automatic repeat request (HARQ) feedback or channel state information (CSI) feedback, and wherein the first path is on an uplink of the remote UE and the second path is on a sidelink of the remote UE;
select, from the first path and the second path, the second path for a retransmission of the uplink communication; and
receive the uplink communication based at least in part on the selected first path or the retransmission of the uplink communication based at least in part on the selected second path.

30. The base station of claim 29, wherein the one or more processors are configured to:
transmit configuration information indicating a rule for selecting a path for the uplink communication.

* * * * *